United States Patent [19]

Zundel

[11] Patent Number: 4,842,623
[45] Date of Patent: Jun. 27, 1989

[54] SOOT COLLECTOR WITH FLUID METERING DEVICE

[75] Inventor: Fritz Zundel, Besigheim, Fed. Rep. of Germany

[73] Assignee: Filterwerk Mann & Hummel GmbH, Ludwigsburg, Fed. Rep. of Germany

[21] Appl. No.: 259,588

[22] Filed: Oct. 18, 1988

[30] Foreign Application Priority Data

Dec. 3, 1987 [DE] Fed. Rep. of Germany ....... 3740907

[51] Int. Cl.$^4$ .............................................. B01D 46/04
[52] U.S. Cl. ................................ 55/262; 55/DIG. 10; 55/DIG. 30
[58] Field of Search ................. 55/261, 262, DIG. 10, 55/DIG. 30; 239/310, 317

[56] References Cited

U.S. PATENT DOCUMENTS

| | | |
|---|---|---|
| 3,181,797 | 5/1965 | Hayes .................................. 239/317 |
| 3,195,985 | 7/1965 | Elkin ................................ 239/310 X |
| 3,421,738 | 1/1969 | Dulger ............................ 239/317 X |
| 4,436,535 | 3/1984 | Erdmannsdoerfer et al. ......... 55/96 |
| 4,576,617 | 3/1986 | Renevot ....................... 55/DIG. 10 |

FOREIGN PATENT DOCUMENTS 3230608 2/1984 Fed. Rep. of Germany .
61-237812 10/1986 Japan .

*Primary Examiner*—Robert Spitzer
*Attorney, Agent, or Firm*—Foley & Lardner, Schwartz, Jeffery, Schwaab, Mack, Blumenthal & Evans

[57] ABSTRACT

A soot collector, e.g., for collection of soot from the exhaust gases of a diesel-powered internal combustion engine, having a fluid metering device which makes possible exact metering of a specified quantity of a soot remover by a controlled flow of compressed air onto the filter medium of the soot collector for regeneration of the filter medium, and which works reliably and can be manufactured economically. The fluid metering device of the soot collector includes a reservoir, a metering tank arranged in the vicinity of the reservoir bottom, a line which bypasses the metering tank, and a fluid inlet opening in the metering tank which can be closed in response to a flow of compressed air through the metering tank.

12 Claims, 1 Drawing Sheet

U.S. Patent  Jun. 27, 1989  4,842,623
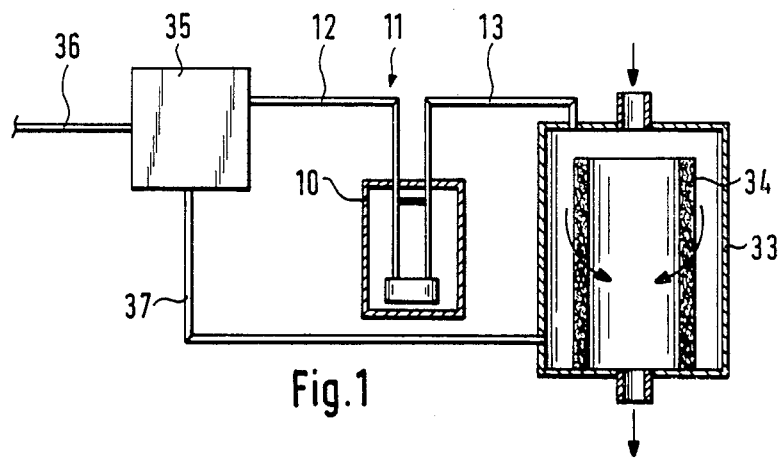
Fig.1
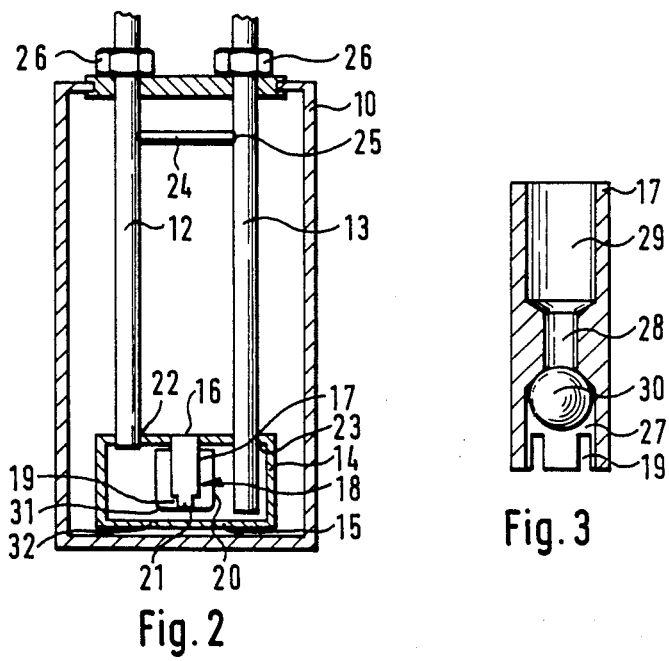
Fig. 2
Fig. 3

SOOT COLLECTOR WITH FLUID METERING DEVICE

BACKGROUND OF THE INVENTION

This invention relates to a soot collector for diesel-powered internal combustion engines having a filter medium and a fluid metering device for feeding a specified quantity of a soot remover by means of compressed air onto the filter medium.

Various processes are in use in order to free soot collectors, in particular for diesel-powered internal combustion engines, from the soot deposited on the filter medium. In one of these processes, a soot remover is applied to the filter medium in order to lower the ignition temperature of the soot, and consequently bring about combustion of the soot at temperatures which can usually be achieved during the normal operation of the internal combustion engine. A process of this kind and a device for implementing it are disclosed in U.S. Pat. No. 4,436,535. The disclosure of this patent relates essentially to the metered addition of a pulverulent soot remover, and particularly to the control means for the controlled and periodic supply of the soot remover. However, it is not possible to discern from this publication how the proportioning of the quantity of a fluid soot remover required to be metered can take place.

There remains a need for a soot collector having a metering device which achieves an exact, reliable metering of the soot remover and which functions with little or no servicing and is simple and economical to manufacture.

SUMMARY OF THE INVENTION

It is the object of the invention to provide a soot collector comprising a soot remover metering device which achieves exact, reliable metering.

Another object of the invention is to provide a soot collector with a metering device which operates with minimal maintenance.

A further object of the invention is to provide a soot collector with a metering device which is simple and economical to produce.

These and other objects of the invention are achieved by providing a soot collector including a filter medium and a fluid metering device for feeding a specified quantity of a soot remover by means of compressed air onto the filter medium, wherein the fluid metering device comprises: (a) a reservoir, (b) a metering tank in fluid communication with said reservoir through a fluid inlet opening, (c) a first connecting line leading from a compressed-air supply device to the metering tank, (d) a second connecting line leading from the metering tank to the soot collector filter, (e) a metering tank bypass line communicating between the first and second connecting lines, and (f) means for closing the fluid inlet opening in response to a flow of compressed air through the metering tank. According to further preferred aspects of the invention, the soot collector is designed particularly for diesel-powered internal combustion engines, the metering tank is arranged in the vicinity of the bottom of the reservoir, the second connecting line extends within the metering tank into the vicinity of the bottom of the metering tank, and the bypass line has a smaller passage cross-section than the connecting lines.

In accordance with a preferred embodiment of the invention, the soot collector comprises a fluid metering device with a reservoir and a metering tank arranged in the vicinity of the bottom of the reservoir. The metering tank serves to determine the quantity of soot remover which is required for a soot burn-off process and is applied to the filter medium by means of compressed air to lower the ignition temperature of the soot. In order to be able to meter as large a quantity as possible of the soot remover stored in the reservoir, the metering tank must be arranged in the vicinity of the reservoir bottom.

The metering tank is connected to a compressed air supply device via a connecting line and to the soot collector filter housing via a further connecting line. The compressed air supply device delivers the compressed air required for conveying the soot remover to the soot collector filter in the quantity required and at the times when combustion of the soot is to be initiated. The connecting lines may be of rigid design or alternatively, at least in the region within the reservoir, of flexible design. Within the metering tank, the connecting line from the metering tank to the soot collector extends into the vicinity of the metering tank bottom to enable the compressed air to effectively convey substantially all of the soot remover found in the metering tank.

Between the two connecting lines, there is a line which bypasses the metering tank and has a smaller passage cross-section than the connecting lines. The bypass line can be arranged either inside or outside the reservoir. In either case, it is advantageous to arrange the bypass line remote from the metering tank to be bypassed since this ensures that when compressed air is applied, a sufficient quantity of compressed air has already flowed through the connecting line to the soot collector filter by the time the soot remover carried along by the compressed air flowing through the metering tank reaches this region of the line. The fluid metering device furthermore has a fluid inlet opening in the metering tank, which opening can be closed by means of compressed air flowing through the metering tank. This enables the metering tank to fill with the fluid soot remover when the compressed air is switched off, while when the flow of compressed air is switched on, only the desired exact amount of soot remover is delivered from the metering tank since the fluid inlet opening for the soot remover from the reservoir into the metering tank is closed.

With a soot collector having a fluid metering device designed in this way, it is possible to successfully effect metering of the soot remover onto the filter medium in order to initiate the combustion process. The metering device is simple and robust and is not prone to malfunctions. It is also simple and economical to manufacture. When no compressed air is applied to the fluid metering device, the metering tank fills with the fluid soot remover. When compressed air is applied, some of the compressed air is channeled past the metering tank via the bypass line into the connecting line leading to the soot collector filter. This design ensures that the line to the soot collector filter is first purged or cleaned by compressed air and that the soot remover is then blown in, in finely divided form. Surprisingly, it has been found that without such a bypass line the soot remover is not discharged from the connecting line to the soot collector filter in finely divided form, but in the form of a concentrated shot. Only by means of the device according to the invention, therefore, is the desired fine distribution of the soot remover on the filter medium achieved through use of a swirl nozzle arranged in the soot collector filter housing.

According to a particularly preferred embodiment, the fluid inlet opening can be closed by means of a ball valve, the ball valve being designed as a casing in the form of an immersion tube extending from the fluid inlet opening into the metering tank and containing a valve ball which can move inside the casing to open or close the inlet opening. This arrangement reliably ensures that soot remover can pass from the reservoir into the interior of the metering tank when no compressed air is applied, while, when compressed air is applied, the valve ball securely closes the fluid inlet opening.

The design of the ball valve is advantageously further simplified by the fact that, at its end remote from the fluid inlet opening, the casing is closed to an extent such that the valve ball cannot escape and the casing wall is provided with at least one fluid outlet opening to permit the fluid soot remover to pass through when the valve is open. The construction of the casing can thereby be simplified even further since it is only in the interior of the casing that it must be ensured that the valve ball prevents the entry of fluid. The casing may extend as far as the bottom of the reservoir in order to achieve a good result with the minimum expenditure.

Surprisingly, it was found possible to improve the way in which the metering device functions if the casing protrudes into a cup arranged in the metering tank. Pulsating leakage flows through the fluid inlet opening when compressed air is applied are thereby reliably avoided.

The configuration of the metering tank as a cylinder, in which the fluid inlet opening and the openings to the connecting lines are arranged in an axial end wall of the cylindrical tank, represents a further structural simplification.

In order to achieve a particularly good atomizing effect on the soot remover, the bypass line may have a substantially smaller passage cross-section than the connecting lines. In this particularly preferred arrangement, the passage cross-section may preferably be one third or less than the cross-section of each of the connecting lines.

According to another advantageous embodiment, the connecting lines are designed as tubes and are rigidly connected to each other within the reservoir by the bypass line and the metering tank. Together they form an exchangeable unit. This enables the essential parts of the metering device to be installed and removed in simple manner, for example for the purpose of filling the reservoir, and permits separate manufacture of the metering device from the remaining components of the soot collector. The connection to the respective connecting lines can then be effected outside the reservoir by means of commercially available union fittings.

BRIEF DESCRIPTION OF THE DRAWINGS

The invention is explained below in further detail with reference to an illustrative embodiment shown in the accompanying drawings, in which:

FIG. 1 is a schematic representation of a soot collector with a fluid metering device according to the present invention;

FIG. 2 is a cross-section through a fluid metering device according to the invention; and FIG. 3 is a section through the casing of the a preferred ball valve for use in the fluid metering device of the present invention.

DETAILED DESCRIPTION OF PREFERRED EMBODIMENTS

The schematic diagram illustrated in FIG. 1 shows a soot collector housing 33 having a filter medium 34 and a compressed-air control device 35 which, on the basis of information, such as, for example, temperature and pressure, transmitted via the instrument lead 37, controls the introduction of compressed air through the compressed air line 36. The compressed-air control device 35 is connected to the soot collector housing via a metering device 11 comprising a reservoir 10 and connecting lines or conduits 12 and 13 for conveying the fluid soot remover.

The metering device is illustrated in detail in FIG. 2 and comprises a reservoir 10 into which protrude a feed conduit 12 for the compressed air and a discharge conduit 13 for the fluid carried along by the compressed air. Conduits 12 and 13 are rigidly connected to one another by a bypass line 24 and a metering tank 14. Outside the reservoir 10, this exchangeable unit has connecting fittings 26 by means of which a connection can be established to a compressed-air supply device and to the soot collector filter housing, respectively. The size of the passage opening 25 of the bypass line 24 is significantly smaller than the passage cross-section of each of conduits 12 and 13.

The metering tank 14 at the lower ends of the conduits 12 and 13 has a fluid inlet opening 16 which opens into the metering tank 14 between the mouths 22 and 23, respectively, of the conduits 12 and 13. The fluid inlet opening 16 can be closed by a ball valve 18. The ball valve 18 comprises a casing 17, inside which the valve ball 30 (FIG. 3) is mounted so as to allow movement. In the illustrative embodiment shown in the drawings, the interior of the casing 17 is designed such that a central region 28 of the casing 17 has a smaller diameter than the two end regions 27 and 29. The valve ball 30 is mounted at that end of the casing 17 which is remote from the fluid inlet opening 16. In this region, the wall of the casing is provided with cut out openings 19 in order to permit the passage of fluid when the valve is open.

The casing 17 is surrounded by a cup 20 and is supported on the bottom 21 of the cup. With its open end, the cup 20 extends into the upper region of the metering tank, without however hindering the flow of the fluid out from the cup 20. In the interior of the metering tank 14, the end of the discharge conduit 13 extends into the vicinity of the tank bottom 15.

FIG. 3 is an enlarged cross-sectional view of the casing 17 containing the valve ball 30. It shows the central region 28 having a smaller diameter than the two end regions 27 and 29. Region 27 exhibits the cut out openings 19 and the valve ball 30, which is shown in this case in the closed position.

In the normal operating condition, the metering device 11 is unpressurized. When a burn-off process is to be initiated, compressed air passes, under the control of the compressed-air control device 35, via connecting line 12 to the metering device 11. Part of the compressed air passes directly to the soot collector filter via bypass line 24 and connecting line 13. The other part is channeled to the soot collector filter via metering tank 14 and connecting line 13. The pressure of the compressed air in the metering tank closes ball valve 18 and prevents further fluid soot remover from entering the metering tank through fluid inlet opening 16. After a specified period of time predetermined by the compressed air control device, the compressed air control device switches the compressed air off again, allowing the metering tank 14 to refill with soot remover through the fluid inlet opening 16. The compressed air passing through the bypass line 24 on the one hand effects a purging or cleaning of the line and on the other hand brings about a fine atomization of the soot remover in the soot collector filter. The cup 20 surrounding the ball valve 18 in the interior of the metering tank 14 ensures reliable filling of the tank and prevents leakage flows through the fluid inlet opening.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A soot collector including a filter medium and a fluid metering device for feeding a specified quantity of a soot remover by means of compressed air onto the filter medium, wherein said fluid metering device comprises:
   (a) a reservoir,
   (b) a metering tank in fluid communication with said reservoir through a fluid inlet opening,
   (c) a first connecting line leading from a compressed-air supply device to said metering tank,
   (d) a second connecting line leading from said metering tank to the soot collector filter,
   (e) a metering tank bypass line communicating between said first and second connecting lines, and
   (f) means for closing said fluid inlet opening in response to a flow of compressed air through said metering tank.

2. A soot collector as recited in claim 1, wherein said means for closing said fluid inlet opening comprise a ball valve.

3. A soot collector as recited in claim 2, wherein said ball valve comprises a casing in the form of an immersion tube extending from said fluid inlet opening into the metering tank, and said casing contains a valve ball which is movable therein to open and close said fluid inlet opening.

4. A soot collector as recited in claim 3, wherein the end of said casing remote from said fluid inlet opening is closed in such a manner as to prevent escape of said valve ball, and at least one fluid outlet opening is provided in a side wall of said casing.

5. A soot collector as recited in claim 4, wherein said casing protrudes into a cup arranged in said metering tank.

6. A soot collector as recited in claim 1, wherein said metering tank has a cylindrical configuration, and said fluid inlet opening and openings for said first and second connecting lines are arranged in an axial end wall of the cylindrical tank.

7. A soot collector as recited in claim 1, wherein said bypass line has a smaller cross-sectional area than said connecting lines.

8. A soot collector as recited in claim 7, wherein the cross-sectional area of said bypass line is at most one-third of the cross-sectional area of each of said first and second connecting lines.

9. A soot collector as recited in claim 1, wherein said first and second connecting lines comprise tubular conduits rigidly connected to each other by said bypass line and said metering tank and together form an exchangeable unit.

10. A soot collector as recited in claim 1, wherein said metering tank is arranged in the vicinity of the bottom of the reservoir so that fluid can flow under the influence of gravity from said reservoir into said metering tank when said fluid inlet opening is open.

11. A soot collector as recited in claim 1, wherein said second connecting line projects within the metering tank into the vicinity of the bottom of the metering tank.

12. A soot collector as recited in claim 1, wherein said filter medium is mounted in the exhaust line of a diesel-powered internal combustion engine.

* * * * *